US012004448B2

(12) United States Patent
Engel

(10) Patent No.: US 12,004,448 B2
(45) Date of Patent: Jun. 11, 2024

(54) ELECTRICAL POWER GENERATION FOR A WORKING IMPLEMENT MECHANICALLY COUPLED TO A PRIMARY MACHINE

(71) Applicant: Deere & Company, Moline, IL (US)

(72) Inventor: Colin D. Engel, Bettendorf, IA (US)

(73) Assignee: Deere & Company, Moline, IL (US)

( * ) Notice: Subject to any disclaimer, the term of this patent is extended or adjusted under 35 U.S.C. 154(b) by 113 days.

(21) Appl. No.: 16/216,370

(22) Filed: Dec. 11, 2018

(65) Prior Publication Data

US 2019/0104685 A1 Apr. 11, 2019

Related U.S. Application Data

(63) Continuation of application No. 14/870,720, filed on Sep. 30, 2015, now Pat. No. 10,188,039.

(51) Int. Cl.
*B60L 50/10* (2019.01)
*A01D 41/12* (2006.01)
(Continued)

(52) U.S. Cl.
CPC ........... *A01D 41/142* (2013.01); *A01D 41/12* (2013.01); *A01D 41/145* (2013.01); *A01D 47/00* (2013.01);
(Continued)

(58) Field of Classification Search
CPC .... A01D 41/12; A01D 41/142; A01D 41/145; A01D 47/00; A01D 69/02; A01D 69/025;
(Continued)

(56) References Cited

U.S. PATENT DOCUMENTS 799,516 A * 9/1905 Bliss ...................... B60L 50/16
307/155
RE14,270 E * 3/1917 Morrison ....................... 290/23
(Continued)

FOREIGN PATENT DOCUMENTS

CN 201011777 Y * 1/2008
CN 201011777 Y 1/2008
(Continued)

OTHER PUBLICATIONS

Brazilian Patent Office Action for Application No. BR102016020969-2 dated Oct. 10, 2019 (6 pages, English translation included).
(Continued)

*Primary Examiner* — Daniel Cavallari
*Assistant Examiner* — Brian K Baxter
(74) *Attorney, Agent, or Firm* — Michael Best & Friedrich LLP

(57) ABSTRACT

Methods and systems are described for providing a local electrical power source at a header of a combine harvester. An alternator is mechanically coupled to a header backshaft. The header backshaft is mechanically coupled to a drive mechanism of the combine harvester to cause rotation of the header backshaft which, in turn, causes the alternator to generate electrical power. A power supply circuit transferred electrical power from the alternator to one or more electric devices mounted on the header. In some implementations, the header does not include any physical cables between the combine and the header.

15 Claims, 4 Drawing Sheets

(51) Int. Cl.
*A01D 41/14* (2006.01)
*A01D 47/00* (2006.01)
*A01D 69/02* (2006.01)
*A01D 75/00* (2006.01)
*B60L 50/60* (2019.01)
*H05B 45/37* (2020.01)

(52) U.S. Cl.
CPC .......... *A01D 69/02* (2013.01); *A01D 69/025* (2013.01); *A01D 75/00* (2013.01); *B60L 50/10* (2019.02); *B60L 50/60* (2019.02); *H05B 45/37* (2020.01)

(58) Field of Classification Search
CPC ......... A01D 75/00; B60L 11/02; B60L 11/18; H05B 33/0803; H02J 7/14; H02J 7/1415; H02J 7/1438; H02J 7/1446
USPC ............................................ 307/9.1; 322/323
See application file for complete search history.

(56) References Cited

U.S. PATENT DOCUMENTS

| | | | | |
|---|---|---|---|---|
| 2,898,542 | A * | 8/1959 | Cholick | F02B 63/04 322/90 |
| 4,009,555 | A * | 3/1977 | Temple | A01D 41/141 56/10.2 E |
| 4,193,250 | A * | 3/1980 | Kessens | A01D 41/141 56/208 |
| 4,314,160 | A * | 2/1982 | Boodman | B60K 25/08 180/2.2 |
| 4,634,887 | A * | 1/1987 | Balch | F02D 31/007 290/3 |
| 5,488,817 | A * | 2/1996 | Paquet | A01D 41/127 56/10.2 R |
| 9,637,000 | B2 * | 5/2017 | Husson | B60K 6/46 |
| 9,828,025 | B1 * | 11/2017 | Hauser | A01D 69/06 |
| 2003/0006075 | A1 * | 1/2003 | Arnold | A01B 51/04 180/53.6 |
| 2004/0148917 | A1 * | 8/2004 | Eastwood | A01D 75/306 56/6 |
| 2006/0076781 | A1 * | 4/2006 | McQueen | H02K 53/00 290/1 R |
| 2006/0236786 | A1 * | 10/2006 | Burton | E21B 7/027 73/863 |
| 2007/0051542 | A1 * | 3/2007 | Wilks | B60L 53/80 180/65.1 |
| 2007/0296223 | A1 * | 12/2007 | Saylor | F02B 63/04 290/1 R |
| 2009/0119954 | A1 * | 5/2009 | Lemieux | E02F 3/847 37/236 |
| 2010/0005769 | A1 * | 1/2010 | Landry | A01D 69/00 56/13.6 |
| 2010/0102762 | A1 * | 4/2010 | Sugimoto | H02M 5/4585 363/71 |
| 2010/0289327 | A1 * | 11/2010 | Mackin | A01D 69/025 307/9.1 |
| 2010/0308559 | A1 * | 12/2010 | Tarasinski | A01B 59/00 280/422 |
| 2011/0001323 | A1 * | 1/2011 | Douglas | F03B 17/062 290/1 R |
| 2012/0029745 | A1 * | 2/2012 | Miyao | F02D 29/00 180/65.265 |
| 2012/0049517 | A1 * | 3/2012 | Yasugi | F03D 9/11 290/44 |
| 2012/0191270 | A1 * | 7/2012 | Floyd | B60Q 1/305 701/2 |
| 2013/0054085 | A1 * | 2/2013 | Casey | H02J 7/14 307/9.1 |
| 2013/0152535 | A1 * | 6/2013 | Roberge | A01D 34/008 56/10.2 R |
| 2014/0175886 | A1 * | 6/2014 | Kwok | H02J 3/32 307/46 |
| 2014/0259804 | A1 * | 9/2014 | Eavenson, Sr. | B60K 6/46 37/246 |
| 2014/0326821 | A1 * | 11/2014 | Bishop | B26D 1/185 242/533.8 |
| 2015/0197239 | A1 * | 7/2015 | Vilar | B60K 6/46 477/5 |
| 2016/0123330 | A1 * | 5/2016 | Thompson | A01C 15/04 417/423.1 |
| 2016/0242356 | A1 * | 8/2016 | Velderman | A01D 75/006 |
| 2017/0013777 | A1 * | 1/2017 | Posselius | A01D 41/141 |
| 2018/0343785 | A1 * | 12/2018 | Funk | A01B 71/06 |
| 2022/0135018 | A1 * | 5/2022 | Sheidler | A01D 41/127 56/10.2 A |

FOREIGN PATENT DOCUMENTS

| | | |
|---|---|---|
| CN | 101904249 A * | 12/2010 |
| CN | 101904249 A | 12/2010 |
| CN | 102860173 A | 1/2013 |
| CN | 102860174 A | 1/2013 |
| EP | 2253196 | 11/2010 |
| WO | 2014156610 | 10/2014 |

OTHER PUBLICATIONS

EP16191124.3 Extended European Search Report dated Feb. 27, 2017 (6 pages).

* cited by examiner

ELECTRICAL POWER GENERATION FOR A WORKING IMPLEMENT MECHANICALLY COUPLED TO A PRIMARY MACHINE

RELATED APPLICATIONS

This application is a continuation of U.S. application Ser. No. 15/870,720, filed Sep. 30, 2015, entitled "ELECTRICAL POWER GENERATION FOR HEADER SYSTEMS FROM A COMBINE BACKSHAFT," the entire contents of which are incorporated herein by reference.

BACKGROUND

The present invention relates to electrical power systems for machines such as a combine harvester are coupled to a working element such as a header.

SUMMARY

Combine harvesters are often coupled to a header that provides a working element. Mechanical power from the combine harvester is transferred to the header by rotating a backshaft. The rotation of the backshaft, in turn, drives the working element of the header. However, because the header is physically separate from the combine, any electrical power or data signals must be transferred to the header. In some implementations, this is done through a multi-pin coupling connector that may be secured by a harness. The harness, the connector, and the cable must be constructed to withstand the adverse operating environment of the combine harvester. As such, the connector cable might be manufactured of a high density material which, in turn, provides for a lower current capacity. Furthermore, the use of such a connector coupling limits customization, configuration, and growth of the combine header because the number of "pins" or data channels in the coupling cable is limited to a defined number (e.g., a 31-pin coupling).

Various implementations described herein provide for increased intelligence, capability, and customizability of a header by providing an electrical power source on the header itself. In particular, an alternator mounted on the header converts mechanical power from the rotating backshaft into electrical power that can be used to power one or more electrical devices positions on the header. With a local power source on the header itself, a controller can be incorporated into the header that provides additional functions on the header itself that currently rely on power or control from the combine harvester. This electrical power source can be used, for example, to operate multiple lights positioned along the header, provide greater intelligence by powering microcontroller-based systems mounted on the header, and to operate electrical motors to control various functions of the header. A header controller that receives electrical power from the alternator can also be adapted to control the mechanical interface between the combine and the header and adjust a ground cutting height based on position feedback.

In one embodiment, the invention provides an electrical power system for a header of a combine harvester. An alternator is mechanically coupled to a header backshaft. The header backshaft is mechanically coupled to a drive mechanism of the combine harvester to cause rotation of the header backshaft which, in turn, causes the alternator to generate electrical power. A power supply circuit transferred electrical power from the alternator to one or more electric devices mounted on the header. In some implementations, the header does not include any physical cables between the combine and the header.

In another embodiment, the invention provides a method of providing power to an electric device mounted on a header of a combine harvester. A header backshaft, that is mechanically coupled to a drive mechanism of the combine harvester, is rotated by the drive mechanism. Electrical power is generated by an alternator positioned on the header and mechanically coupled to the header backshaft such that rotation of the header backshafter is converted to electrical power by the alternator. The electrical power generated by the alternator is then transferring to one or more electric devices mounted on the header using a power supply circuit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
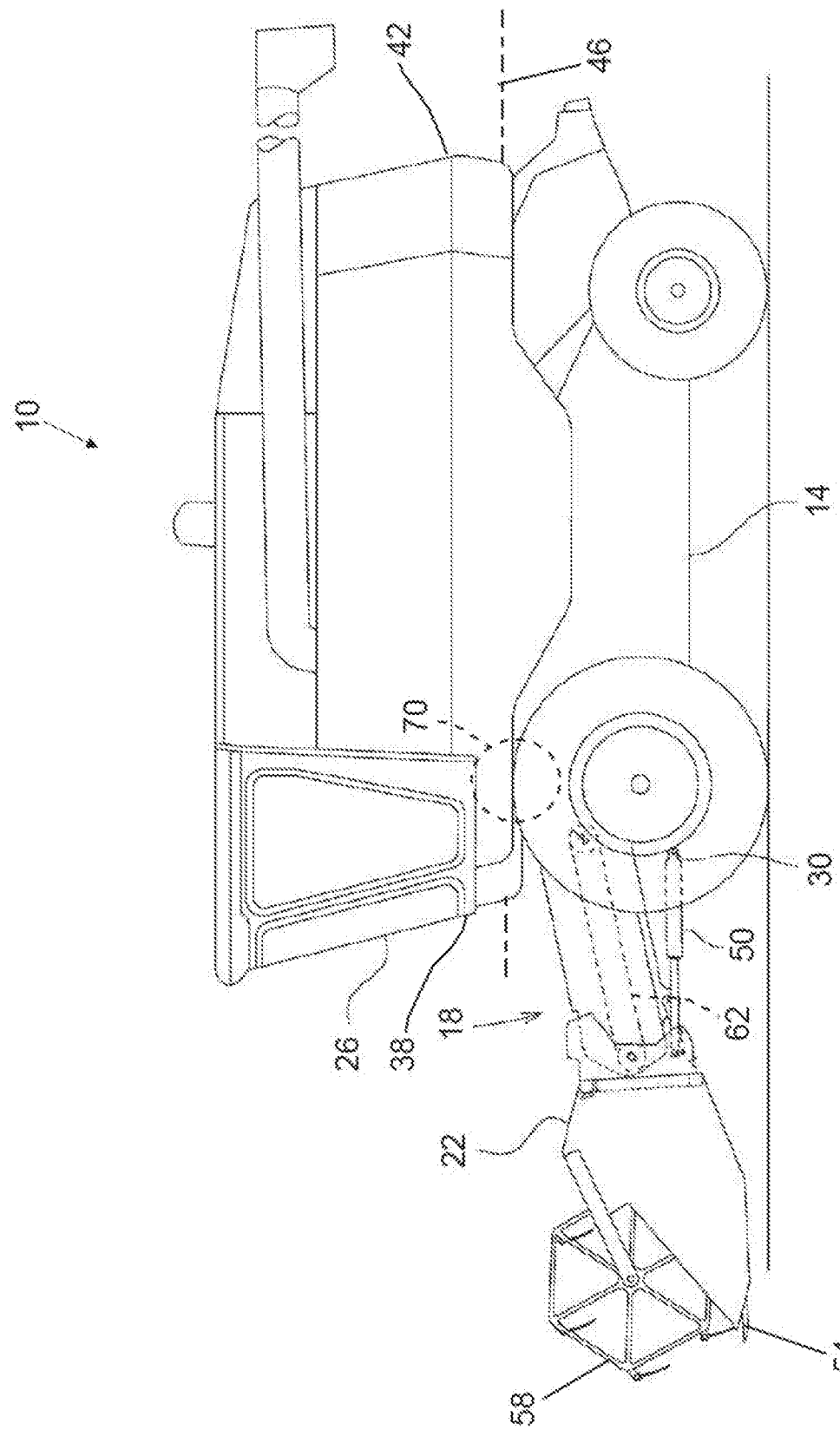
FIG. 1A is a side-view of a combine harvester equipped with a first header according to one embodiment.

FIG. 1A illustrates a combine harvester 10 including a vehicle chassis or frame 14, a feeder throat or feederhouse 18, and a harvester header 22 for cutting and gathering crop plants (not shown). The frame 14 includes an operator cab 26 and traction elements 30 (e.g., wheels) for supporting and moving the vehicle frame 14 with respect to the ground. The frame 14 includes a first or forward end 38 and a second or rear end 42, and a chassis axis or frame axis 46 extends between the forward end 38 and the rear end 42. The feederhouse 18 is supported on the forward end 38 of the frame 14 and may be pivoted relative to the vehicle frame 14 by an actuator 50 (e.g., a fluid cylinder).

The header 22 is supported by the feederhouse 18 and extends transversely to the frame 14. As used herein, "transverse" generally refers to an orientation that is perpendicular to the frame axis 14 of the harvester 10 and that extends laterally-between a first side of the harvester 10 and a second side of the harvester 10.

In the illustrated embodiment, the header 22 is a draper including a cutting bar 54 and rotating drum 58; in other embodiments, the header 22 may include another type of implement depending on the type of crop to be harvested. After the crop is cut by the cutting bar 54 and gathered on the header 22, it is moved along the feederhouse 18 by an elevator 62 (e.g., a conveyor) toward a threshing mechanism 70 supported on the frame 14.

Figure 1B:
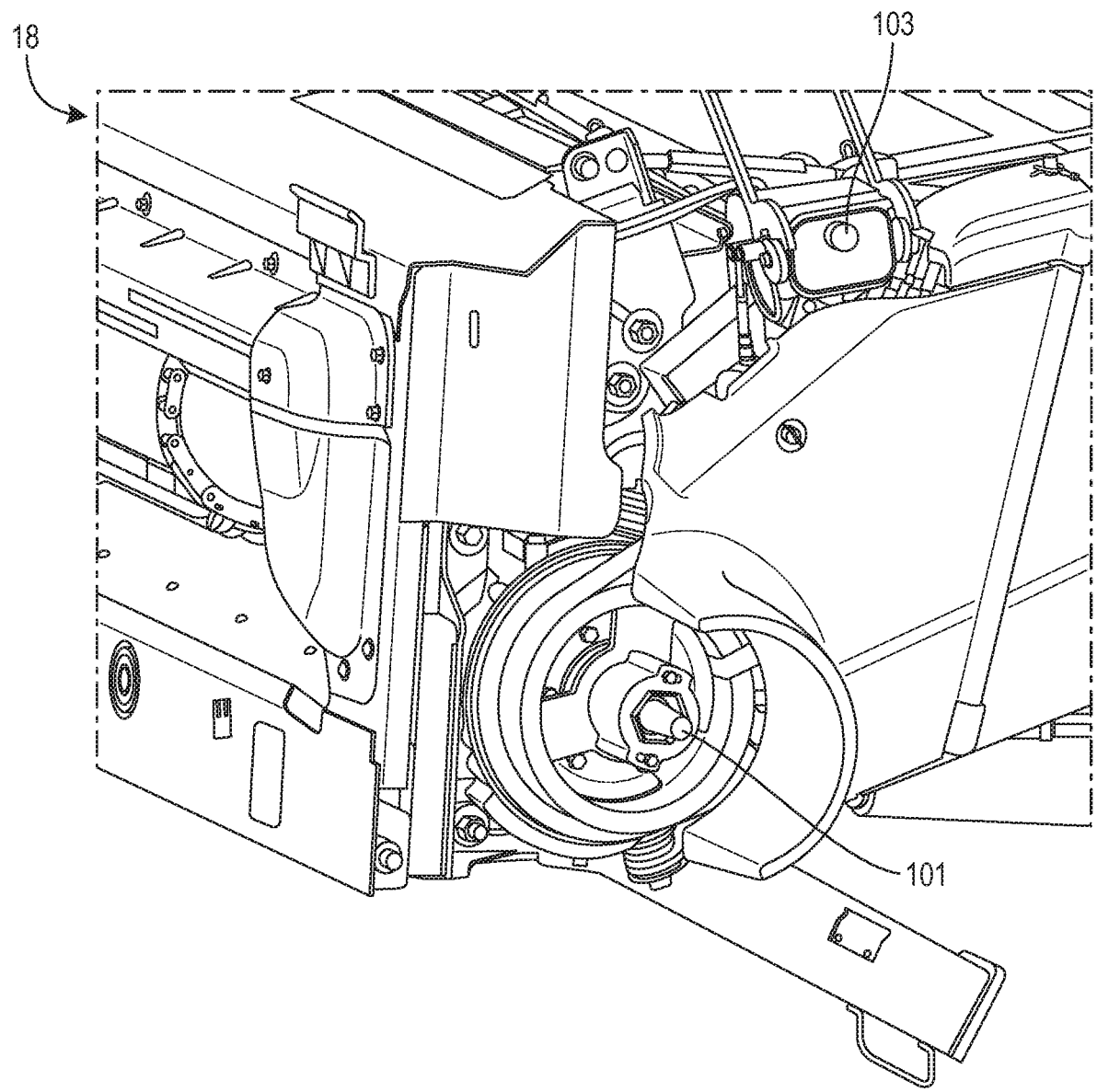
FIG. 1B is a perspective view of a coupling between the header and the combine in the embodiment of FIG. 1A.

FIG. 1B shows the feederhouse 18 of the combine harvester 10 with the header 22 removed. As shown in FIG. 1B, the feederhouse 18 is couplable to the header 22 by a backshaft 101. The backshaft 101 is rotated by a mechanical drive mechanism of the combine harvester 10. For example, in various implementations, the backshaft 101 may be coupled by a belt or drive chain to a combustion engine, a transmission, or one of the rotating traction elements (e.g., wheels) of the combine harvester 10. A coupler 103 is also positioned on the feederhouse 18 and is coupled to the header 22 by a cable to for data communication and, in some implementations, to provide electrical power from the combine harvester 10 to the header 22.

However, in some implementations, the backshaft 101 of the header is coupled to an alternator mounted on the header 22 to generate electrical power from the rotation of the backshaft 101 and to provide a source of electrical power on the header 22 itself. As further illustrated in FIG. 2, the combine harvester 10 includes a combine mechanical drive element 201 and a main combine controller 203. The mechanical drive 201 of the combine harvester 10 is mechanically coupled to the header backshaft 101. In some implementations, the resulting rotation of the backshaft 101 drives the rotation of a header working element 207 such as, for example, the rotating drum 58 in the example of FIG. 1A. The rotation of the backshaft 101 also transfers mechanical power through a gear box 209 to an alternator 211 mounted on the header 22. As such, the alternator 211 generates electrical power from the rotation of the backshaft 101.

In some implementations, the operation of the alternator 211 is controlled by an alternator controller 213 which may include a processor and a non-transitory computer-readable memory. Electrical power from the alternator 211 is provided to one or more inventers (e.g., inverter 215 and inverter 217) which convert the AC power from the alternator 211 to DC power that can be utilized by one or more electric devices mounted on the header 22. The operation of each inverter 215, 217 is controlled by an inverter controller 219, 221, respectively. In some implementations, electrical power from the inverter 215 (or inverter 217 or both) is stored to a battery 222 positioned on the header 22. Electrical power from the battery 222 can then be used to power the electric devices of the header 22 when the backshaft 101 is not rotating and can be used to smooth the power supplied to the electric devices to account for variations in electric power provided by the alternator (for example, due to varying speeds of the backshaft).

The type of electric device mounted on the header 22 may vary in implementations. However, the example of FIG. 2 includes one or more lights 223 mounted on the header 22, one or more rotational electric motors 225, and one or more linear electric motors 227. The electric lights 223 can be positioned along the housing of the header 22 to improve the operator's view of the fields particularly during nighttime harvesting. In some implementations, the rotating drum 58 can be powered by an electric motor 225 and, as such, the system illustrated in FIG. 2 can be used to retrofit a new electrically-powered rotating drum header 22 on a combine harvester 10 that is still configured with a backshaft 101 to transfer mechanical power.

Figure 3:
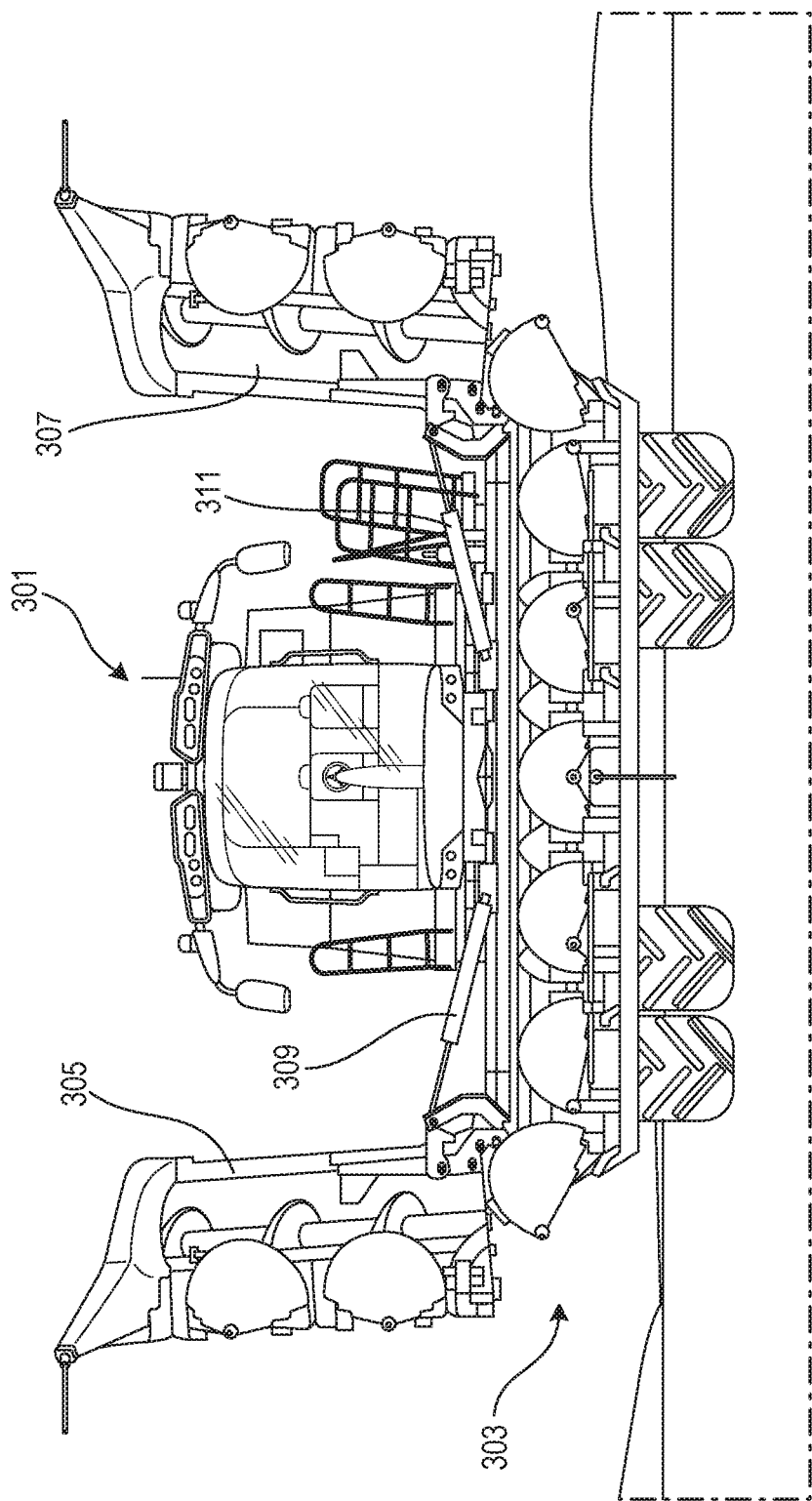
FIG. 3 is a front-view of a combine harvester equipped with a different header according to another embodiment.

FIG. 3 illustrates an example of another type of header. In this example, the combine harvester 301 is equipped with a corn header 303. This header 301 is wider and, in order to facilitate improved mobility and easier storage, the outer arms 305, 307 of the header 303 can be raised by a lift element 309, 311, respectively, until they are positioned at 90-degree angles relative to the center portion of the header 303. In some implementations, the lift elements 309, 311 include an electric motor 227 that is powered by an alternator 211 coupled to the backshaft 101.

Returning now to FIG. 2, in some implementations, the operation of one or more of the electric devices of the header 22 are controlled by a header controller 229. The header controller 229 can be communicatively linked to the main combine controller 203 through the data coupling 103 positioned on the feederhouse 18. As such, an operator sitting in the cab 26 can operate a user interface control (not pictures) positioned in the cab to, for example, turn on the header lights 223 or adjust the speed/operation of the rotation motor 225 or the linear motor 227. In such cases, a signal from the user interface control is provided to the main combine controller 203 which relays a control instruction through the data coupling 103 to the header controller 229. The header controller 229 then operates the electric device based on the received control instruction.

Figure 2:
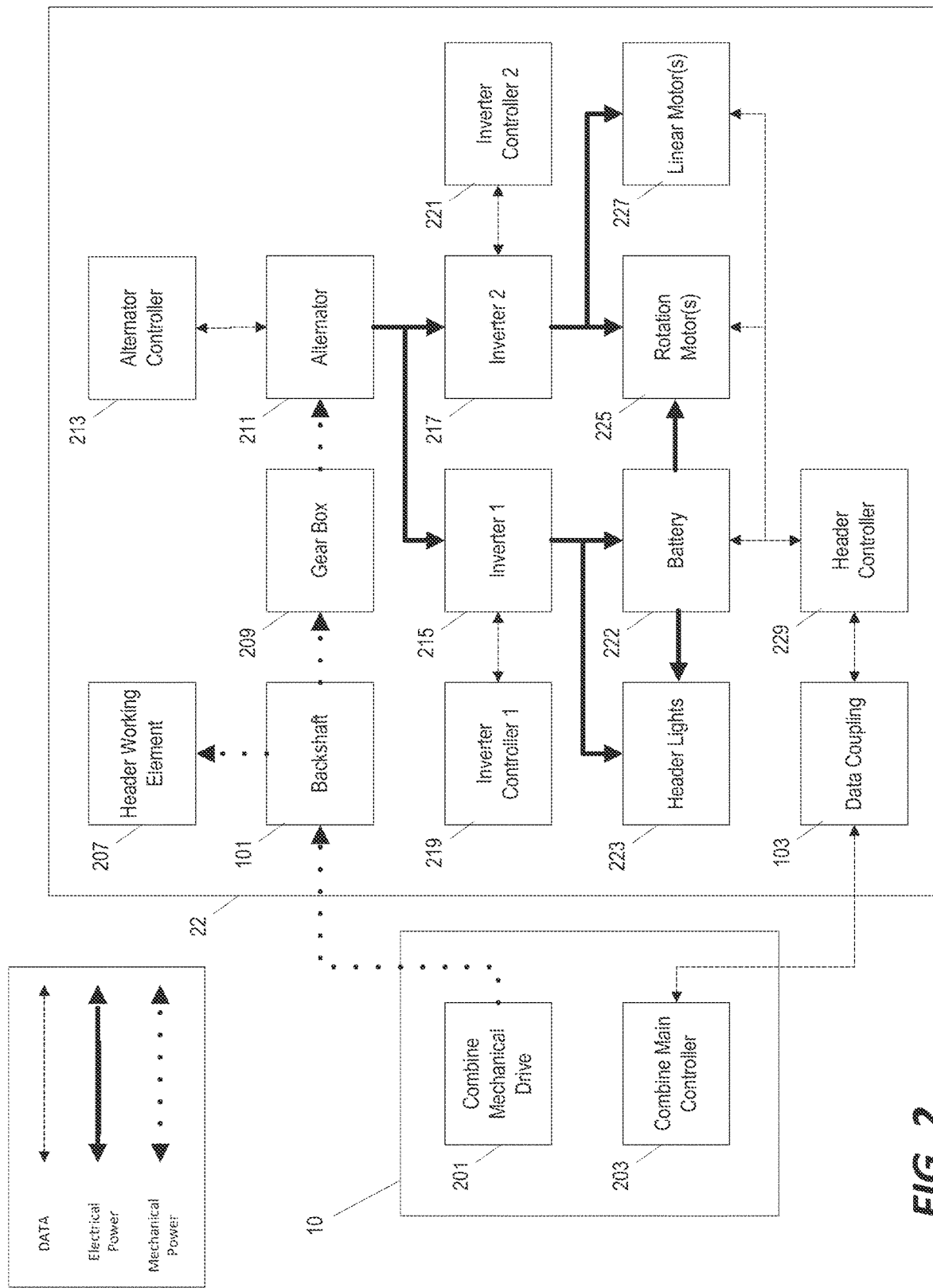
FIG. 2 is a block diagram of a power supply system for the header in the embodiment of FIG. 1A.

It is noted that, although FIG. 2 illustrates multiple controllers positioned on the header (e.g., an alternator controller 213, a first inverter controller 219, a second inverter controller 221, and a header controller 229), other implementations may include more, fewer, or different controllers. For example, a header 22 may be equipped with only a single header controller 229 which receives control instructions from the main combine controller 203 and operates the alternator 211, all inverters 215, 217, and any electrical devices.

Furthermore, although the examples illustrated above show a data coupling 103 that is physically mounted on the feederhouse of the combine and uses a cable to transfer data signals from the combine controller 203 to the header controller 229, other data couplings may be used in other implementations. For example, because the header controller 229 and the electrical devices on the header have a power source on the header itself, in some implementations it is not necessary to include a coupling that is capable of providing any electrical power from the combine harvester to the header. As such, the data coupling 103, in some implementations, may include a wireless transceiver for wireless receiving data signals and commands from the main combine controller 203. In some such implementations, no physical electrical cables are provided to couple the combine harvester to the header.

Finally, although the example of FIG. 2 illustrates a single alternator 211 with two inverters 215, 217, other configurations are possible. For example, the alternator 211 can include a 12V automotive alternator that can be used to provide electrical power to relatively low-power devices such as light-emitting diode (LED)-type header lights 223 and the one or more controllers of the header. In other implementations, such as the one illustrated in FIG. 2, the alternator 211 can include a dual-voltage alternator that is capable of providing up to 60V of power. Devices such as LED header lights 223 are powered at the lower voltage level while the higher voltage level is used to drive higher-power electrical system such as an electrical motor 225/227 driving a rotating drum, lifting the header, or folding the arms of the header (see, e.g., FIG. 3).

Thus, the invention provides, among other things, a header power system that includes an alternator mechanically coupled to a backshaft to provide an electrical power source for electrical devices mounted on the header. Various features and advantages of the invention are set forth in the following claims.

What is claimed is:

1. An electrical power system for a working implement, the working implement being mechanically couplable through a drive shaft of the working implement to a primary machine to transfer mechanical power generated by the primary machine to the working implement, wherein the working implement includes a mechanical working element, wherein the mechanical power generated by the primary machine drives a first mechanical function of the primary machine and, by transferring the mechanical power to the working implement, drives operation of the mechanical working element of the working implement, the electrical power system comprising:

an electrical generator mounted to the working implement and mechanically coupled to the mechanical working element, wherein the electrical generator is configured to convert mechanical power received by the working implement from the primary machine into electrical power;

a battery mounted to the working implement;

a power supply circuit mounted to the working implement and configured to transfer the electrical power from the electrical generator to one or more electric devices mounted on the working implement and configured to smooth electrical power provided to the one or more electric devices by controllably supplementing electrical power from the electrical generator with stored electrical power from the battery based on variations in the mechanical power received by the working implement due to varying speeds of the drive shaft.

2. The electrical power system of claim 1, wherein the electrical generator includes an alternator and wherein the power supply circuit is configured to charge the battery by transferring electrical power from the electrical generator to the battery.

3. The electrical power system of claim 1, wherein mechanical power from the primary machine causes a rotation of the drive shaft of the working implement, wherein rotation of the drive shaft of the working implement drives operation of the mechanical working element of the working implement, and wherein the electrical generator includes an alternator mechanically coupled to the drive shaft of the working implement and is configured to convert the rotation of the drive shaft into the electrical power.

4. The electrical power system of claim 3 wherein the power supply circuit includes an inverter configured to convert AC power from the alternator to DC power that is provided to the one or more electric devices mounted on the header.

5. The electrical power system of claim 1, wherein the electrical generator includes a dual-voltage electric generator, and wherein the power supply circuit is configured to provide electrical power to a first electric device at a first voltage and to provide electrical power to a second electric device at a second voltage.

6. The electrical power system of claim 1, further comprising a plurality of LED lamps mounted on the working implement, wherein he power supply circuit is configured to transfer electrical power from the electrical generator to the one or more electric devices by transferring electrical power to each LED lamp of the plurality of LED lamps.

7. The electrical power system of claim 1, further comprising a working implement controller mounted on the working implement and coupled to the electrical generator to receive electrical power from the electrical generator, wherein the working implement controller is configured to control the operation of at least one electric device of the one or more electric devices.

8. The electrical power system of claim 1, wherein the working implement includes no mechanism for receiving electrical power from the primary machine.

9. An electrical power system for a working implement, the working implement being couplable through a drive shaft of the working implement to a primary machine vehicle and including a mechanical working element, the electrical power system comprising:

a battery mounted to the working implement;

a power supply circuit configured to smooth electrical power provided to the one or more electric devices by controllably supplementing electrical power from the electrical generator with stored electrical power from the battery based on variations in mechanical power provided for operation of the mechanical working element due to varying speeds of the drive shaft; and an electrical generator mounted to the working implement, wherein the electrical generator is configured to convert the mechanical power into electrical power, and provide the electrical power from the electrical generator to one or more electric devices mounted on the working implement.

10. The electrical power system of claim 9, wherein the electrical generator provides power to the battery to charge the battery.

11. The electrical power system of claim 9, wherein the working implement includes no mechanism for receiving electrical power from the primary machine vehicle.

12. An electrical power system for a header of a combine harvester, the header including a mechanical working element, the electrical power system comprising:

a battery mounted to the header, wherein the header includes a header backshaft mechanically coupled to the mechanical working element;

a power supply circuit configured to level electrical power provided to the one or more electric devices by controllably supplementing electrical power from the electrical generator with stored electrical power from the battery based on variations in mechanical power provided for operation of the mechanical working element due to varying speeds of the header backshaft; and an electrical generator mounted to the header, wherein the electrical generator is configured to convert mechanical power for operation of the mechanical working element into electrical power, and provide the electrical power to one or more electric devices mounted on the header.

13. The electrical power system of claim 12, wherein the electrical generator provides power to the battery to charge the battery.

14. The electrical power system of claim 12 wherein rotation of the header backshaft drives the operation of the mechanical working element, and wherein the electrical generator includes an alternator mechanically coupled to the header backshaft and is configured to convert rotation of the header backshaft into the electrical power.

15. The electrical power system of claim 12, wherein the header includes no mechanism for receiving electrical power from the combine harvester.

\* \* \* \* \*